US012636663B2

(12) United States Patent
Zeiter

(10) Patent No.: US 12,636,663 B2
(45) Date of Patent: May 26, 2026

(54) PUMP HOUSING ARRANGEMENT AND USE OF A DISPENSER PUMP

(71) Applicant: KAO GERMANY GMBH, Darmstadt (DE)

(72) Inventor: Frank Zeiter, Darmstadt (DE)

(73) Assignee: KAO GERMANY GMBH, Darmstadt (DE)

( * ) Notice: Subject to any disclaimer, the term of this patent is extended or adjusted under 35 U.S.C. 154(b) by 133 days.

(21) Appl. No.: 18/729,680

(22) PCT Filed: Jan. 17, 2023

(86) PCT No.: PCT/EP2023/051002
§ 371 (c)(1),
(2) Date: Jul. 17, 2024

(87) PCT Pub. No.: WO2023/151905
PCT Pub. Date: Aug. 17, 2023

(65) Prior Publication Data
US 2025/0099994 A1 Mar. 27, 2025

(30) Foreign Application Priority Data
Feb. 14, 2022 (EP) .................................... 22156507

(51) Int. Cl.
*B05B 11/10* (2023.01)

(52) U.S. Cl.
CPC ................................ *B05B 11/1005* (2023.01)

(58) Field of Classification Search
CPC ........................ B05B 11/1005; B05B 11/1001
See application file for complete search history.

(56) References Cited

U.S. PATENT DOCUMENTS 1,392,600 A * 10/1921 Rose .................... A47K 5/1209 222/510
6,334,552 B1 * 1/2002 Bougamont ........ B05B 11/1088 222/341

(Continued)

FOREIGN PATENT DOCUMENTS

WO 96/28257 A1 9/1996
WO WO-0139893 A1 * 6/2001 ......... B05B 11/1098
WO 2007/091882 A1 8/2007

OTHER PUBLICATIONS

International Search Report dated Mar. 9, 2023, in connection with PCT International Application No. PCT/EP2023/051002.

(Continued)

*Primary Examiner* — Paul R Durand
(74) *Attorney, Agent, or Firm* — Norris McLaughlin, PA

(57) ABSTRACT

Pump housing arrangements and methods of dispensing liquid for cosmetic applications from dispenser pumps are provided. The pump housing arrangements comprise a chamber, an inlet channel, an outlet channel, and a movable piston, wherein the chamber comprises a flexible wall part adapted to be expanded outwards with respect to the inside volume of the chamber at an increasing inside pressure of the chamber, and a blocking element relative moveable with respect to the chamber between a blocking position and an operating position is provided. The blocking element blocks an expansion of the wall part in the blocking position and enables the expansion of the wall part in the operating position.

16 Claims, 2 Drawing Sheets

(56) References Cited

U.S. PATENT DOCUMENTS

Figure 1:
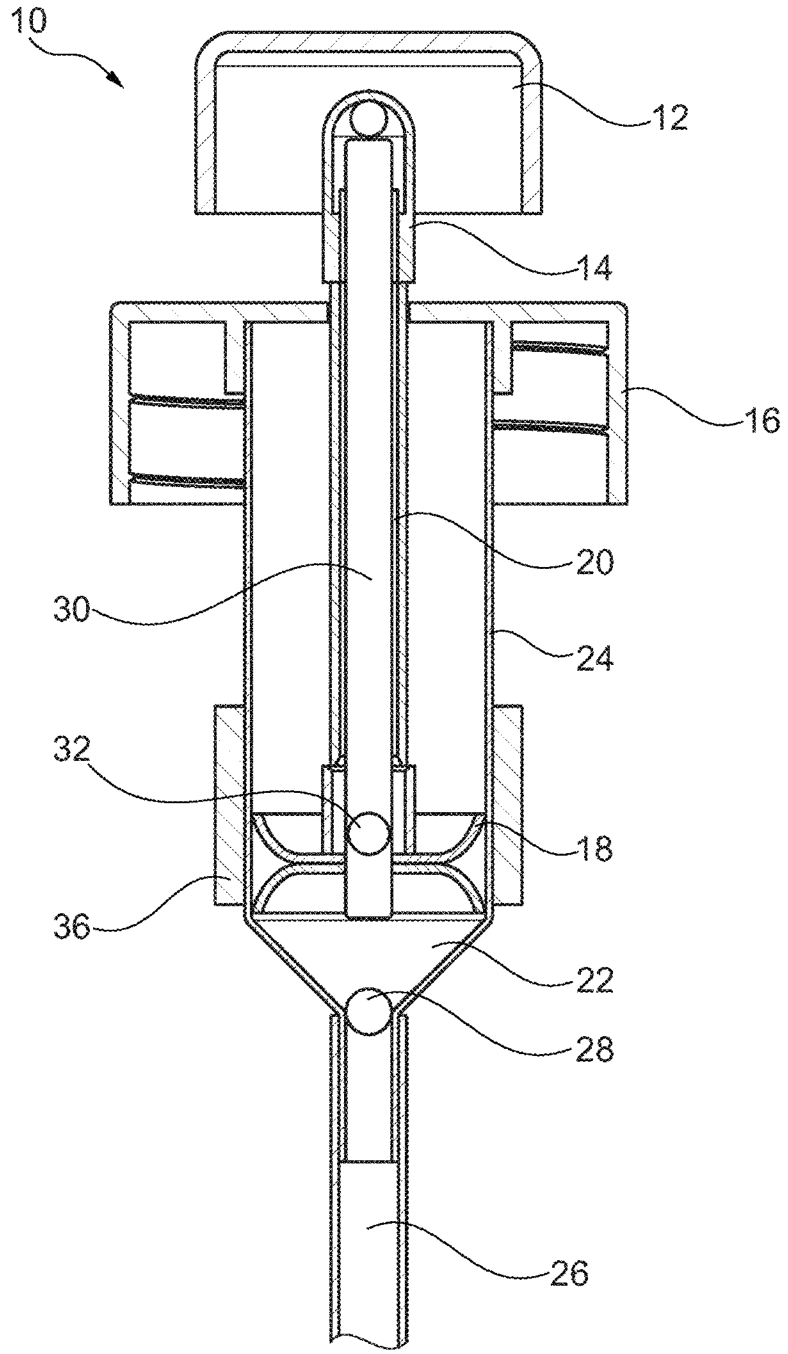

| | | | | |
|---|---|---|---|---|
| 2005/0261423 | A1* | 11/2005 | Funkhauser | C08F 2/22 422/131 |
| 2010/0301070 | A1* | 12/2010 | Allef | A47K 5/1202 222/207 |
| 2025/0099994 | A1* | 3/2025 | Zeiter | B05B 11/1001 |

OTHER PUBLICATIONS

Written Opinion in connection with PCT International Application No. PCT/EP2023/051002.

* cited by examiner

PUMP HOUSING ARRANGEMENT AND USE OF A DISPENSER PUMP

This application is a 371 of International Patent Application No. PCT/EP2023/051002, filed Jan. 17, 2023, which claims foreign priority benefit under 35 U.S.C. § 119 of the European Patent Application No. 22156507.0, filed Feb. 14, 2022, the disclosures of which are incorporated herein by reference.

The invention relates to a pump housing arrangement and a use of a dispenser pump, by means of which a fluid can be dispensed in different amounts easily, particularly for applying a cosmetic fluid to human hair.

WO 96/28257 A1 discloses a dispenser pump comprising a dip tube and a piston pipe for pumping a liquid into a channel of a housing and from there through the piston to a chamber of a dispenser head via a valve. From the chamber of the dispenser head the liquid can be dispensed via a further valve of the dispenser head. The dispenser head can be pushed down for pumping the liquid against the spring force of a spring element which can push the dispenser head back in its starting position.

There are situations where a different amount of the dispensed fluid is wanted. This is particularly the case in the field of hair dressers, where in one situation a smaller amount of dispensed liquid and in the other situation a larger amount of dispensed liquid is suitable, so that differently designed dispensers are required, which comprise differently shaped housings for providing a different amount of dispensed liquid per stroke. However, there is a permanent need for reducing productions costs for a series of similar dispensers adapted to different output amounts.

It is an object of the invention providing alternative measurements for reducing productions costs for a series of similar dispensers adapted to different output amounts.

The solution of this object is provided according to the invention by a pump housing arrangement according to the features of claim 1, a dispenser pump according to the features of claim 11, a series of dispenser pumps according to the features of claim 14 as well as a use according to the features of claim 15. Preferred embodiments of the invention are given by the dependent claims, which can constitute each solely or in combination an aspect of the invention. If a feature is shown in combination with another feature, this serves only to simplify the presentation of the invention and is in no way intended to imply that this feature cannot also be a further development of the invention without the other feature.

An aspect of the invention is directed to a pump housing arrangement for a dispenser pump, comprising a chamber for receiving a fluid to be dispensed inside an inside volume of the chamber, an inlet channel for sucking in the fluid into the chamber, an outlet channel for dispensing the fluid out of the chamber and a movable piston bordering an axial side of the chamber, wherein the chamber comprises a flexible wall part adapted to be expanded outwards with respect to the inside volume of the chamber at an increasing inside pressure of the chamber, and a blocking element relative moveable with respect to the chamber between a blocking position and an operating position is provided, wherein the blocking element blocks an expansion of the wall part in the blocking position and enables the expansion of the wall part in the operating position.

When the blocking element is positioned in the blocking position, an expansion of the flexible wall part is blocked by the blocking element. Although the wall part is flexible, the flexible wall part behaves like a rigid part of the chamber by means of the rigid blocking element. A dispenser pump comprising the pump housing arrangement would act like a dispenser pump adapted to deliver high output amount of the dispensed fluid, when the blocking element is located in the blocking position. A user would pump a full stroke of the dispenser pump and would apply the full maximum amount of the fluid to be dispensed.

When the blocking element is positioned in the operating position during the manufacturing of the dispenser pump, an expansion of the flexible wall part is enabled and not blocked anymore. When a user pumps a full stroke of the dispenser pump comprising the pump housing arrangement, the increasing pressure inside the chamber effects an expansion of the flexible wall part outwards. The flexible wall part may provide a bypass for a partial amount of the fluid located in the inner volume of the chamber at the outside of the chamber with or without being leaked. The effective volume of the chamber increases by the additional volume provided by the expanded wall part, so that a partial amount of the fluid to be dispensed may escape into the additional volume bordered at one side by the expanded wall part. If so, the expanded wall part may open a bypass opening so that a part of the amount of the fluid may spill back into a fluid reservoir from which the fluid was sucked into the chamber. The amount of the fluid, which is delivered by means of the moving piston can be reduced, since at least the amount of the fluid located in the addition volume of an expanded pocket provided by the expanded wall part cannot be pumped by means of the piston. Further, a maximum pressure inside the chamber can be reduced due to the increased effective volume of chamber provided by the additional volume of the expanded wall part. This leads to the effect, that a smaller amount of the fluid is dispensed compared to the amount of the dispensed fluid, when the blocking element is positioned in its blocking position. The amount of the fluid to be dispensed can be easily adjusted between a larger amount and a smaller amount by moving the blocking element between the blocking position and the operating position.

The amount of the fluid to be dispensed is not adjusted by changing a piston stroke and/or the design of the housing, but by changing the effective volume of the chamber and/or the maximum applicably pressure inside the chamber during the dispensing stroke of the piston. The handling of a dispenser pump remains unchanged for a user independently whether a larger amount and a smaller amount of the fluid to be dispensed is selected by means of the blocking element. Each dispenser pump for a particular series of dispenser pumps adapted to different output amounts can be assembled of the same manufacturing parts and only differs by the position of the blocking element, so that the number of manufacturing parts can be reduced enabling a cost-efficient production by mass production. Since the blocking element easily allows an adjustment of the amount of the fluid to be dispensed during the manufacture of the dispenser pump, while the manufacturing parts for a series of similar dispenser pumps remains mainly identical, reduced productions costs for a series of similar dispensers adapted to different output amounts are enabled.

The chamber may by of cylindrical design. Particularly, the chamber may comprise a tubular part or consist of a tubular part, into which the piston may be received. The piston and the chamber may be sealed against each other at a circumferential surface of the piston, which is supported by an inner surface of the chamber, preferably via a sealing, like a piston ring. When the piston is moved, preferably along an axial direction of the chamber, outwards with respect to the chamber for increasing the effective volume inside the chamber, a negative pressure can be applied inside the chamber, by which the fluid to be dispensed can be sucked into the chamber via the inlet channel. Particularly the inlet channel comprises a one-directional valve. When the piston is moved, preferably along the axial direction of the chamber, inwards with respect to the chamber for decreasing the effective volume inside the chamber, a positive pressure can be applied inside the chamber, by which the fluid to be dispensed can be pressed into the outlet channel. Particularly the outlet channel comprises a one-directional valve. The fluid can be delivered via the outlet channel towards a pump head of the dispenser pump. The pump head may be connected, particularly rigidly connected, to the piston, preferably by a rigid material of the outlet channel beginning at an axial face of the piston pointing towards the inner volume of the chamber. The chamber, the piston, the inlet channel and/or the outlet channel may be made from a, particularly rigid, thermoplastic material.

If applicable, the flexible wall part may be one-piece with the remaining chamber, but comprises a significantly smaller wall thickness, so that the flexible wall part may be flexible and/or expandable with respect to the remaining chamber and the remaining chamber may be rigid with respect to the flexible wall part. Particularly the flexible wall part is a separate part with respect to the chamber and fixed to the chamber. In this case, the material for the chamber can be selected with respect to provide a rigid form, particularly for supporting the movable piston, wherein the material for the flexible wall part can be selected with respect to provide a sufficient amount of expansion without being teared in the expanded state. The flexible wall part comprises a surface pointing towards the inner volume of the chamber, which is fluid communication with the inner volume of the chamber, so that the pressure inside the inner volume of the chamber applies to the surface of the flexible wall part. An elastic deformation of the flexible wall part may depend at a given elasticity of the material of the flexible wall part on the pressure inside the chamber and on the position of the blocking element only. The flexible wall part may be made from an elastomeric and/or rubber material and/or a medical silicon material.

The blocking element may be made from a rigid material, particularly a thermoplastic material. The blocking element may be guided at the outside of the chamber. Particularly the blocking element is loss-proof, but relative movable connected with the chamber. The blocking element may by manipulated by hand, so that a user may move the blocking element between the blocking position and the operating position by hand. The blocking element may comprise a handling element, like a flange, protruding away from the inner volume of the chamber, so that the position of blocking element with respect to the chamber can be set during the manufacturing of the dispenser pump for the dispenser. The blocking element may restrict the expansion of the flexible wall part, particularly to a minimum, in the blocking position. Particularly a free space between an outer surface of the chamber and the blocking element is chosen such that a clearance for moving the blocking element without frictional blocking is provided but the flexible wall would abut the blocking element in the blocking position mainly without providing a significant additional volume, for example an additional volume of less than 10%, particularly less than 5% und preferably less than 1% of the additional volume provided in the expanded state during a dispensing stroke, when the blocking element is in the operating position. When the blocking element is positioned in the operating position, the expansion of the flexible wall is not or at least by a smaller amount with respect to blocking posing restricted by the blocking element. If so, the expansion of the flexible wall part may be restricted by the dispenser housing of the dispenser pump preventing a tearing of the flexible wall part.

A guiding for the blocking element may be provided. Particularly the blocking element may be linear guided at the chamber and/or at the dispenser housing of the dispenser pump, wherein the pump housing arrangement is inserted. The blocking element may comprise at least one protrusion protruding radially inwards, wherein the at least one protrusion may provide a guiding element resting on a lower or upper rim of the chamber, and/or at least one protrusion protruding radially outwards, wherein the at least one protrusion may provide a guiding element resting on an axial face of a groove inside the dispenser housing of the dispenser pump of the chamber. The blocking element cannot fall apart due the form-fit blocking of the protrusion and/or the remaining blocking element, but can still be moved relative to the chamber, particularly in circumferential direction, in dependence of the course of the corresponding surface supporting the protrusion. The surface of the rim of the chamber and/or the axial face of the groove of the dispenser housing may run for example in circumferential direction only.

If so, more than one flexible wall part, particularly of different size and/or different expandability, is provided. The blocking element may be adapted to unblock at least two flexible wall parts in the same position and/or different flexible wall parts in different subsequent selectable positions. The different amounts of the fluid to be dispensed can be varied accordingly via a large scale and/or several intermediate amounts of the fluid to be dispensed can be provided at corresponding different relative positions of the blocking element relative to the chamber. This enables a series of more than two similar dispensers adapted to different output amounts.

Particularly the inside volume of the chamber is increased and/or the inside pressure of the chamber is reduced in the operating position of the blocking element compared to the blocking position of the blocking element during a dispensing of the fluid via the outlet channel. The selected amount of the fluid to be dispensed is adjusted by the effective volume of the chamber and/or the effective maximum pressure inside the chamber during the dispensing stroke. It is not necessary changing the displacement length of the piston for changing the amount of the fluid to be dispensed by using differently designed manufacturing parts, so that a variation of the maximum displacement length of the piston for different selected amounts of the fluid to be dispensed can be omitted. The Pump housing arrangement is adapted to keep the maximum displacement length of the piston for different selected amounts of the fluid to be dispensed mainly constant.

Preferably the flexible wall part of the chamber is provided by a flexible membrane fixed to the chamber, particularly at an outer surface of chamber pointing away from the inside volume of the chamber, wherein the membrane closes a relief opening of the chamber. The chamber may comprise at least one large relief opening covered by the membrane. The chamber may comprise a plurality of small relief openings covered by the one membrane. The at least one relief opening allows a flow of the fluid to be dispensed from the inner volume of the chamber into the at least one relief opening, so that the fluid can apply the inner pressure of the chamber at the membrane. When the applied inner pressure is high enough, the inner pressure may expand the membrane, when not blocked by the blocking element in the operating position. The membrane may lift off partially from the outer surface of the chamber for opening a bypass opening, so that a part of the fluid inside the chamber can spill out the chamber back into the fluid reservoir. When a part of the amount of the fluid inside the chamber is bypassed via the bypass opening opened by the membrane in the expanded state, the inner pressure of the chamber decreases so that the membrane closes the bypass opening by meeting the outer surface of the chamber again, so that only a predefined amount of the fluid can be bypassed. When the blocking element is positioned in the blocking position the at best slightly expanded membrane contacts the blocking element and the applied inner pressure is supported by the blocking element.

Particularly the membrane is designed as a flexible hose arranged at an axial part at the outer surface of the chamber and elastically pressed against the outer surface of the chamber. The chamber can be arranged press-fitted into the hose, so that the elastic material of the hose covers the relief opening of the chamber. An additional fastening technique attaching the membrane with the outer surface of the chamber can be spared so that the manufacturing costs can be reduced.

Particularly preferred the flexible wall part is located at a lateral surface of the chamber outside an overlapping axial area with the piston and in fluid communication with the inside volume of the chamber. The chamber may comprise a residual volume which is even present, when the piston is located at a relative position with respect to the chamber, where the inner volume of the chamber is at its minimum. The flexible wall part may be in fluid communication with the residual volume of the chamber at any position of the piston. A reduced maximum possible inner pressure inside the chamber in the operating position of the blocking element with respect to the blocking position of the blocking element can be provided and/or maintained, when the inner volume of the chamber is minimal and the inner pressure applied by the piston is maximal. Further a step in the present pressure, which may occur, when the piston would pass the flexible wall part, can be avoided, so that a sudden change in the flow of the dispensed fluid, which would hinder the application of the fluid by the user, can be avoided.

Particularly the blocking element is designed as a ring relative turnable with respect to the chamber and adapted to be manipulated by hand, wherein the blocking element comprises a blocking wall for blocking the flexible wall part in the blocking position and at least one open window for being arranged above the flexible wall part in the operating position, wherein the window is located offset in circumferential direction with respect to the blocking wall. The blocking element cannot fall apart in radial direction with respect to the chamber due to the annular design of the blocking element. For instance, the blocking element may comprise a ring part from which a collar part protrudes in axial direction over a part of the circumferential extension of the ring part providing the blocking wall. The at least one window could be provided at the circumferential extension of the ring part where no blocking wall is provided by means of the protruding collar part. Particularly the window is open at one axial end pointing away from the ring part, so that the material of the blocking element is provided at only one axial end of the window. The axial extension of the blocking element can be minimized keeping the material costs low.

The blocking element, particularly the ring part, may comprise a guiding element, like a nose guided in a groove, by which the blocking element is guided at the chamber and/or the movability of the blocking element is restricted.

Particularly the blocking element is linear guided at the chamber and/or at the dispenser housing of the dispenser pump, wherein the pump housing arrangement is inserted. The blocking element may comprise at least one protrusion protruding radially inwards, wherein the at least one protrusion may provide a guiding element resting on an upper rim of the chamber, and/or at least one protrusion protruding radially outwards, wherein the at least one protrusion may provide a guiding element resting on an axial face of a groove inside the dispenser housing of the dispenser pump of the chamber. The blocking element cannot fall apart downwards due the form-fit blocking of protrusion, but can still be moved relative to the chamber, particularly in circumferential direction, in dependence of the course of the corresponding surface supporting the protrusion.

Preferably the blocking element comprises several windows, wherein each window unblocks a differently large area of the flexible wall part. The same flexible wall part may expand by a different amount in dependence of size and/or form of the window placed above the flexible wall part, so that a different amount of the fluid can be dispensed in dependence of one selected operating position of the several provided operating positions of blocking element during the manufacture of the dispenser pump. In addition or in the alternate, the same window can be placed above differently sized and/or formed flexible wall parts for selecting an intended amount for the fluid to be dispensed. This enables a series of several similar dispensers adapted to different output amounts using the same manufacturing parts.

Particularly preferred the blocking element is turnable with respect to the chamber by a maximum amount $\Delta\alpha$ in circumferential direction of $15° \leq \Delta\alpha \leq 135°$, particularly $30° \leq \Delta\alpha \leq 90°$ and preferably $45° \leq \Delta\alpha \leq 60°$. The selection of a particular amount for the fluid to be dispensed can be easily selected by turning the blocking element by hand during the manufacturing of the dispenser pump. Particularly only one manipulation by hand is sufficient switching the position of the blocking element between the blocking position and at least one operating position. Preferably a least one marking is provided at the outside of the chamber and/or at the outside of the dispenser housing of the dispenser pump indicating a specific selected amount of the fluid to be dispensed during the manufacturing of the dispenser pump. The manufacturing process is facilitated and accelerated leading to reduced manufacturing costs.

Particularly the flexible wall part is covered at an inner surface of chamber pointing towards the inside volume of the chamber by a rigid sieve. The rigid sieve provides a relief opening and can be adapted to block a deformation of the flexible wall part into the inner volume of the chamber, particularly when a negative pressure is provided inside the inner volume. The whole inner volume of the chamber can be filled by the fluid during a stroke of piston for sucking in the fluid via the inlet channel. Particularly in the case, that the flexible wall part is provided by means of a separate flexible membrane fixed at the outer surface of the chamber, the rigid sieve can be provided by a plurality of openings in the rigid material of the chamber covered by the membrane.

Preferably at least one releasable locking means for locking the blocking element in the blocking position and/or in the operating position is provided. The blocking element can be locked in the blocking position and/or in the at least one operating position, so that the blocking element cannot erroneously displaced during the further handling until the dispenser is manufactured. The locking means may be provided by means of a clip-connection, a spring-loaded locking pin, an increased friction and/or the like. Particularly preferred the locking means locks the blocking element permanently joined and/or non-detachably. Due to the permanent lock, the blocking element is locked in a particular position during the manufacturing process and cannot released anymore after the dispenser pump is assembled and no access to the blocking element is present anymore. An accidentally detaching of the blocking element out of the selected position, for instance by means of a strong shock, is prevented.

Particularly preferred the blocking element comprises at least one protruding actuating flange for moving the blocking element between the blocking position and the operating position by hand. The blocking element can be easily turned by via the actuating flange during the manufacturing of the dispenser pump. Further the actuating flange may define a ring volume between the outer surface of the chamber and the inner surface of the pump housing, facilitating a bypass flow of the fluid from the chamber via the bypass opening opened by the expanded wall part for spilling back a partial amount of the fluid back into the fluid reservoir.

A further aspect of the invention is directed to a dispenser pump for dispensing a fluid, particularly a liquid, comprising a dispenser housing to be held by a user, a pump housing arrangement, which may be designed as previously described, arranged inside the dispenser housing, a dispenser head for applying the fluid, wherein the dispenser head communicates with the outlet channel of the pump housing arrangement, wherein a free space is provided between the chamber and the dispenser housing for receiving the expanded flexible wall part. The dispenser pump may be further designed as previously described with respect to the pump housing arrangement. Since the blocking element easily allows an adjustment of the amount of the fluid to be dispensed during the manufacture of the dispenser pump, while the manufacturing parts for a series of similar dispenser pumps remains mainly identical, reduced productions costs for a series of similar dispensers adapted to different output amounts are enabled.

Particularly the dispenser head is connected with the piston via the outlet channel penetrating the piston for providing a fluid communication between the dispenser head with the inside volume of the chamber. The outlet channel can also provide the function of a stem connecting the piston with the dispenser head.

Preferably the inlet channel communicates via an inlet valve with a fluid reservoir for storing the fluid to be dispensed, wherein the inlet valve is adapted to open at a negative pressure and to close at a positive pressure inside the chamber. A partial amount of fluid can be sucked into the chamber from the fluid reservoir, wherein a back flow is prevented. The fluid inside the inner volume of the chamber can only escape the chamber via the outlet channel.

A further aspect of the invention is directed to a series of dispenser pumps, comprising a first dispenser pump, which may be designed as previously described, wherein the blocking element of the first dispenser pump is located in its blocking position and a second dispenser pump, which may be designed as previously described, wherein the blocking element of the second dispenser pump is located in its operating position, wherein all respective manufacturing parts of the first dispenser pump and the second dispenser pump are identically formed. Since the blocking element easily allows an adjustment of the amount of the fluid to be dispensed during the manufacture of the dispenser pump, while the manufacturing parts for a series of similar dispenser pumps remains mainly identical, reduced productions costs for a series of similar dispensers adapted to different output amounts are enabled.

A further aspect of the invention is directed to a use of a dispenser pump, which may be designed as previously described, for dispensing a liquid for a cosmetic application, particularly for treating human hair. Since the blocking element easily allows an adjustment of the amount of the fluid to be dispensed during the manufacture of the dispenser pump, while the manufacturing parts for a series of similar dispenser pumps remains mainly identical, reduced productions costs for a series of similar dispensers adapted to different output amounts are enabled.

Figure 2:
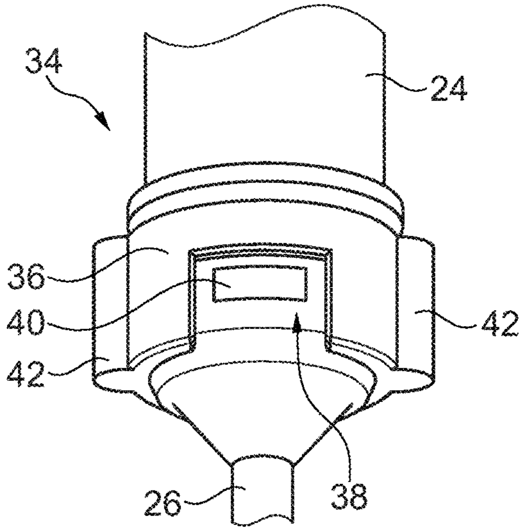
Figure 3:
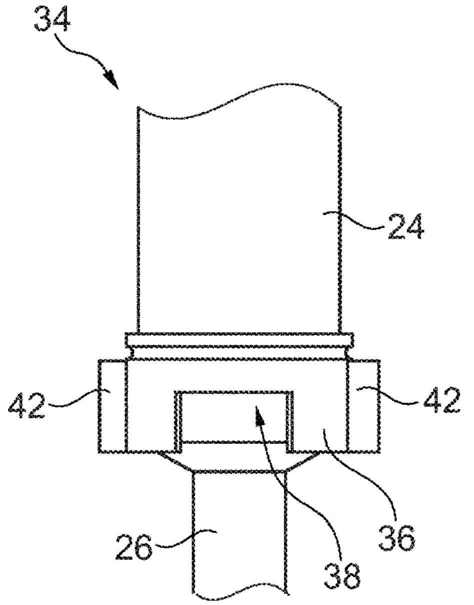
Figure 4:
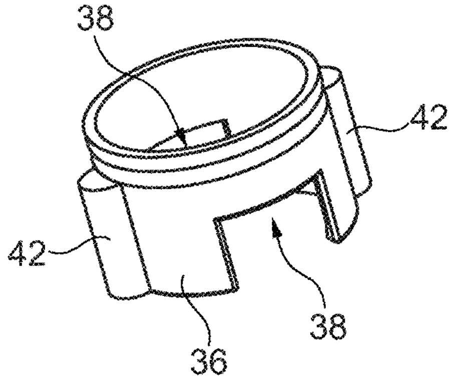
Figure 5:
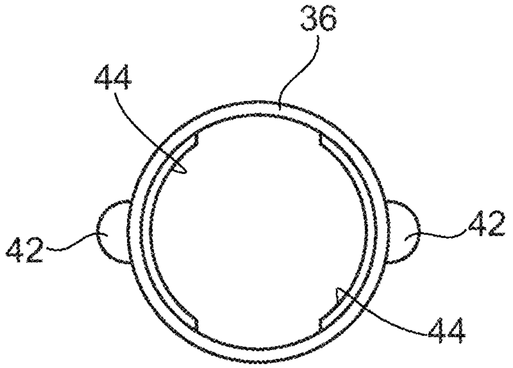

These and other aspects of the invention will be apparent from and elucidated with reference to the embodiments described hereinafter, wherein the described features can constitute each solely or in combination an independent aspect of the invention. In the drawings:

FIG. 1: a simplified sectional view of a dispenser pump,

FIG. 2: a perspective view of a pump housing arrangement for the dispenser pump of FIG. 1 in an operating position, FIG. 3: a perspective view of the pump housing arrangement of FIG. 2 in a blocking position, FIG. 4: a perspective view of a blocking element for the pump housing arrangement of FIG. 2 and FIG. 3 and FIG. 5: a top view of the blocking element of FIG. 4.

The dispenser pump 10 illustrated in FIG. 1 can be used for dispensing a specifically selected amount of a fluid, particularly provided as a liquid. Preferably the fluid is used for a cosmetic application like providing a liquid onto the hair of a client applied by a hair dresser. The dispenser pump 10 comprises a dispenser head 12, which can be pushed downwards against a spring force of a spring 14 supported by a connector cap 16. The connector cap 16 is adapted to be connected, particularly screwed, to a dispenser housing, particularly a bottle or the like, where the fluid to be dispensed is stored. The dispenser head 12 is connected with a piston 18 via a stem 20. The piston 18 provides a movable upper axial face of an inside volume 22 of a chamber 24, so that the amount of the inside volume 22 can be changed by moving the piston 18 during a stroke of the piston 10. When the piston 18 moves upwards by means of the spring force of the spring 14 out of the illustrated position, the inside volume 22 of the chamber 24 increases and a negative pressure is present in the inside volume 22. A fluid to be dispensed can be sucked into the inside volume 22 via an inlet channel 26 comprising an inlet valve 28 designed as a one-directional valve due to the negative pressure. When the piston 18 moves downwards by means of pushing the dispenser head 12 by hand into the illustrated position, the inside volume 22 of the chamber 24 decreases and a positive pressure increases in the inside volume 22. The fluid to be dispensed can be pumped out of the inside volume 22 via an outlet channel 30 comprising an outlet valve 32 designed as a one-directional valve due to the positive pressure. The outlet channel 30 penetrates the piston 18 and is provided inside the stem 14 in the illustrated embodiment. The fluid pumped through the outlet channel 30 may leave the dispenser 12 via a not illustrated nozzle of the dispenser heads 14. The inlet channel 26 is designed as a dip tube communicating with a not illustrated fluid reservoir inside a not illustrated lower part of the dispenser housing of the dispenser pump 10. A similar dispenser pump 10 is shown in WO 96/28257 A1.

The dispenser pump 10 comprises a pump housing arrangement 34 as illustrated in FIG. 2 and FIG. 3 with can be received between the upper part of the dispenser housing and the lower part of the dispenser housing inside the dispenser housing. The chamber 24 is surrounded at its outer surface within a lower axial end part of the chamber 24 by a ring-like blocking element 36. The blocking element 36 comprises a window 38 along a part of the axial extension of the blocking element 36 provided by a recess, where no material of the blocking element 36 is present. In the illustrated embodiment, the window 38 is open at its lower axial end and extends in circumferential direction by for example 45°+15°. A separate membrane 40 is fixed at the outer surface of the chamber 24 covering at least one opening or a plurality of openings in the material of the chamber 24 providing a flexible wall part of the chamber 24. The blocking element 36 can be turned by applying a force at a radially outwards protruding actuating flange 42 during the manufacturing process. When the blocking element 36 is positioned at a circumferential angle, where the membrane 40 is located inside the window 38, as illustrated in FIG. 2, an operating position of the blocking element 36 is selected. When the pressure inside the chamber 24 is increased, a partial amount of the fluid present inside the chamber 24 may bypass the outlet channel 30 and pushed outside the chamber 24 by expanding the flexible membrane 40 radially outwards through the window 38. The membrane 40 may lift off the outer surface of the chamber 24 so that a bypass opening is opened and a part of the fluid may spill out the chamber 24 via the bypass opening back to the fluid reservoir until the inside pressure of the chamber 24 is decreased at an amount where the bypass opening is closed again by the membrane meeting the outer surface of the chamber 24 again. A smaller amount of the fluid is delivered via the outlet channel 30 in the operating position of the blocking element 36.

When the blocking element 36 is turned into a blocking position, as illustrated in FIG. 3, the flexible membrane 40 is fully covered by the material of the blocking 36. When the pressure inside the chamber 24 is increased, the membrane 40 cannot elastically deformed anymore, but meets the rigid blocking element 36 mainly immediately, so that no partial amount of the fluid present inside the chamber 24 may bypass the outlet channel 30 anymore. The fluid cannot expand the membrane 40 anymore and cannot be pushed outside the chamber 24 through the window 38 anymore. The full, i. e. a larger, amount of the fluid is delivered via the outlet channel 30 in the blocking position of the blocking element 36. Although the amount of the fluid to be delivered can be set to different amounts by means of turning the blocking element 36 during the manufacturing process, the stroke length of the piston 18 stays the same in the operating position of the blocking element 36 as well as in the operating position of the blocking element 36.

As can be derived from FIG. 3 the blocking element 36 may comprise more than one window 38. In the illustrated embodiment, two identical formed windows 38 may be arranged above two identical designed flexible wall part s of the chamber 24 in the operating position of the blocking element 36, so that the amount of the fluid to be delivered can be reduced further. However, it is possible that two or more differently formed windows 38 may be used for the same membrane 40 and/or two or more differently formed membranes 40 may be used for the same window 38, so that a corresponding number of different amounts for the fluid to be dispensed can be selected. This enables a series of several similar dispensers adapted to different output amounts using the same manufacturing parts.

As can be derived from FIG. 4, the blocking element 36 may comprise radially inwards protruding guiding elements 44. The guiding elements can be located in axial direction between a lower rim of the chamber 24 and an inner surface of the dispenser housing, so that the blocking element 36 can be loss-proof connected to the chamber 24, but stays turnable with respect to the chamber 24. The blocking element 36 may be linear guided along the lower rim of the chamber 24 by means of the guiding elements 44 sliding along the lower rim of the chamber and/or by means of the blocking element 36 sliding along the dispenser housing.

The invention claimed is:

1. A pump housing arrangement for a dispenser pump, comprising:

a chamber for receiving a fluid to be dispensed inside an inside volume of the chamber;

an inlet channel for sucking in the fluid into the chamber;

an outlet channel for dispensing the fluid out of the chamber; and a movable piston bordering an axial side of the chamber, wherein the chamber comprises a flexible wall part adapted to be expanded outwards with respect to the inside volume of the chamber at an increasing inside pressure of the chamber, a blocking element relative moveable with respect to the chamber between a blocking position and an operating position is provided, and the blocking element blocks an expansion of the flexible wall part in the blocking position and enables the expansion of the flexible wall part in the operating position.

2. The pump housing arrangement according to claim 1, wherein the inside volume of the chamber is increased and/or the inside pressure of the chamber is reduced in the operating position of the blocking element compared to the blocking position of the blocking element during a dispensing of the fluid via the outlet channel.

3. The pump housing arrangement according to claim 1, wherein the flexible wall part of the chamber is provided by a flexible membrane fixed to the chamber, wherein the flexible membrane closes a relief opening of the chamber.

4. The pump housing arrangement according to claim 1, wherein the flexible wall part of the chamber is provided by a flexible membrane fixed to the chamber at an outer surface of chamber pointing away from the inside volume of the chamber, wherein the flexible membrane closes a relief opening of the chamber.

5. The pump housing arrangement according to claim 1, wherein the flexible wall part is located at a lateral surface of the chamber outside an overlapping axial area with the piston and in fluid communication with the inside volume of the chamber.

6. The pump housing arrangement according to claim 5, wherein the blocking element is turnable with respect to the chamber by a maximum amount $\Delta\alpha$ in circumferential direction of $15° \leq \Delta\alpha \leq 135°$.

7. The pump housing arrangement according to claim 5, wherein the blocking element is turnable with respect to the chamber by a maximum amount $\Delta\alpha$ in circumferential direction of $45° \leq \Delta\alpha \leq 60°$.

8. The pump housing arrangement according to claim 1, wherein the blocking element is designed as a ring relative turnable with respect to the chamber and adapted to be manipulated by hand, wherein the blocking element comprises a blocking wall for blocking the flexible wall part in the blocking position and at least one open window for being arranged above the flexible wall part in the operating position, wherein the at least one window is located offset in circumferential direction with respect to the blocking wall.

9. The pump housing arrangement according to claim 8, wherein the blocking element comprises several windows, wherein each window unblocks a differently large area of the flexible wall part.

10. The pump housing arrangement according to claim 1, wherein the flexible wall part is covered at an inner surface of chamber pointing towards the inside volume of the chamber by a rigid sieve.

11. The pump housing arrangement according to claim 1, wherein at least one releasable locking means for locking the blocking element in the blocking position and/or in the operating position is provided.

12. The pump housing arrangement according to claim 1, wherein the blocking element comprises at least one protruding actuating flange for moving the blocking element between the blocking position and the operating position by hand.

13. The dispenser pump for dispensing the fluid, comprising a dispenser housing to be held by a user, the pump housing arrangement according to claim 1 arranged inside the dispenser housing, and a dispenser head for applying the fluid, wherein the dispenser head communicates with the outlet channel of the pump housing arrangement, wherein a free space is provided between the chamber and the dispenser housing for receiving the expanded flexible wall part.

14. The dispenser pump according to claim 13, wherein the dispenser head is connected with the piston via the outlet channel penetrating the piston for providing a fluid communication between the dispenser head with the inside volume of the chamber.

15. The dispenser pump according to claim 13, wherein the inlet channel communicates via an inlet valve with a fluid reservoir for storing the fluid to be dispensed, wherein the inlet valve is adapted to open at a negative pressure and to close at a positive pressure inside the chamber.

16. A method comprising:

dispensing a liquid for a cosmetic application from the dispenser pump according to claim 13.

* * * * *